United States Patent
Ballester Munoz et al.

(10) Patent No.: US 10,704,285 B2
(45) Date of Patent: Jul. 7, 2020

(54) JOINING DEVICE OF A METAL SEGMENT TO A CONCRETE SEGMENT IN A HYBRID HOLLOW TOWER

(71) Applicant: GAMESA INNOVATION & TECHNOLOGY, S. L., Sarriguren (Navarra) (ES)

(72) Inventors: Francisco Ballester Munoz, Santander (ES); Jokin Rico Arenal, Santander (ES); Jorge Gil Fernandez, Santander (ES); Fco. Javier Perez Fernandez, Sarriguren (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 14 days.

(21) Appl. No.: 15/566,481

(22) PCT Filed: Apr. 6, 2016

(86) PCT No.: PCT/ES2016/000043
§ 371 (c)(1),
(2) Date: Oct. 13, 2017

(87) PCT Pub. No.: WO2016/166387
PCT Pub. Date: Oct. 20, 2016

(65) Prior Publication Data
US 2018/0320400 A1  Nov. 8, 2018

(30) Foreign Application Priority Data

Apr. 17, 2015 (ES) .................................. 201500269

(51) Int. Cl.
*E04H 12/08* (2006.01)
*F03D 13/20* (2016.01)
(Continued)

(52) U.S. Cl.
CPC ............. *E04H 12/08* (2013.01); *E04H 12/02* (2013.01); *E04H 12/12* (2013.01); *F03D 13/20* (2016.05);
(Continued)

(58) Field of Classification Search
CPC .......... F03D 13/20; E04H 12/08; E04H 12/12
See application file for complete search history.

(56) References Cited

U.S. PATENT DOCUMENTS 1,762,815 A * 6/1930 Gloeser ................. B28B 23/043
264/228
3,927,497 A * 12/1975 Yoshinaga .............. E02D 27/38
52/169.1
(Continued)

FOREIGN PATENT DOCUMENTS

ES 2 280 852 T 9/2007
WO 2005/015013 A1 2/2005

OTHER PUBLICATIONS

International Search Report (ISR) dated Jun. 21, 2016 mailed in connection with International Application No. PCT/ES2016/000043.
(Continued)

*Primary Examiner* — Paola Agudelo
(74) *Attorney, Agent, or Firm* — Ladas & Parry LLP

(57) ABSTRACT

A joining device of a metal segment to a concrete segment of a hollow tower. The joining device is formed by a set of bolts passing by one of its ends by holes of an anchoring ring and attached to its both sides by a first set of nuts and arranged to be attached by its other end to the base of the metal segment by a second set of nuts. The anchoring ring includes a set of connectors extending externally and internally thereto in a substantially perpendicular direction to the bolts and arranged so do not interfere with reinforcement. The invention also refers to a hollow tower comprising at
(Continued)

least one metal segment joined to a concrete segment by the joining device.

13 Claims, 4 Drawing Sheets

(51) Int. Cl.
    *E04H 12/02*           (2006.01)
    *E04H 12/12*           (2006.01)

(52) U.S. Cl.
    CPC ..... *F05B 2230/60* (2013.01); *F05B 2240/912* (2013.01); *Y02E 10/728* (2013.01)

(56) References Cited

U.S. PATENT DOCUMENTS

| | | | | |
|---|---|---|---|---|
| 4,981,005 A * | 1/1991 | McGinnis | ............... | E04H 12/08 228/178 |
| 5,505,033 A * | 4/1996 | Matsuo | ................... | E02D 27/42 52/169.9 |
| 6,474,030 B1 * | 11/2002 | Ueda | ....................... | E02D 27/14 405/229 |
| 7,694,473 B2 * | 4/2010 | Jakubowski | .......... | E04H 12/085 52/223.4 |
| 9,416,530 B2 * | 8/2016 | Espinosa | ............... | E04B 1/2604 |
| 9,790,925 B2 * | 10/2017 | Schacknies | ........... | E02D 27/425 |
| 2007/0006541 A1 * | 1/2007 | Seidel | ..................... | E02D 27/42 52/292 |
| 2010/0257811 A1 * | 10/2010 | Jakubowski | ............ | E02D 27/42 52/700 |
| 2011/0138707 A1 * | 6/2011 | Bagepalli | ................ | E02D 27/42 52/173.1 |
| 2013/0081350 A1 * | 4/2013 | Bogl | ....................... | E04H 12/08 52/651.01 |
| 2015/0308067 A1 * | 10/2015 | Seidel | ..................... | E02D 27/42 405/250 |
| 2018/0238070 A1 * | 8/2018 | Chase | .................... | E04H 12/12 |

OTHER PUBLICATIONS

Search Report issued in foreign counterpart European Patent Application No. 167796552.3.

* cited by examiner

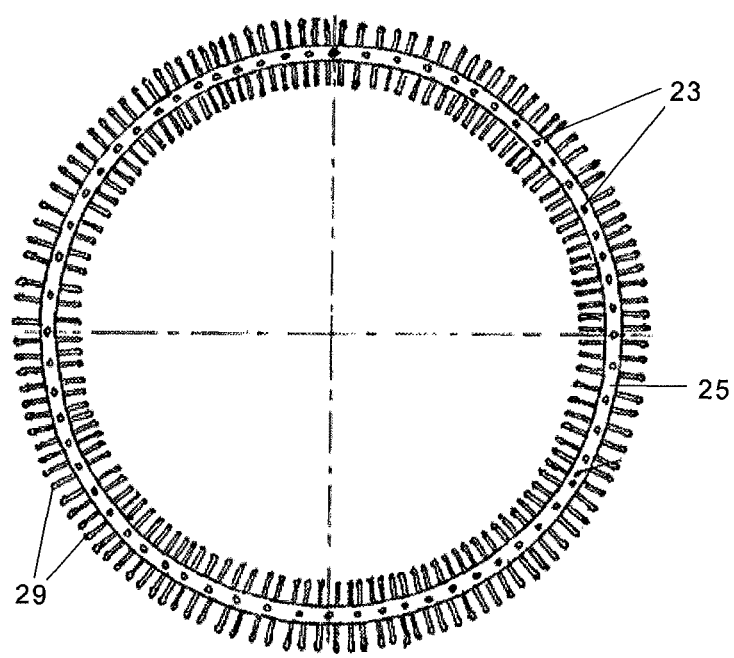
FIG. 4c
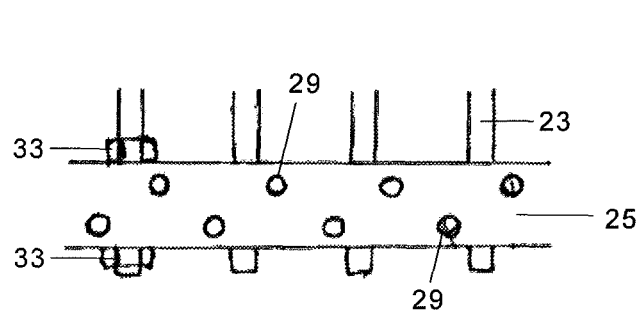 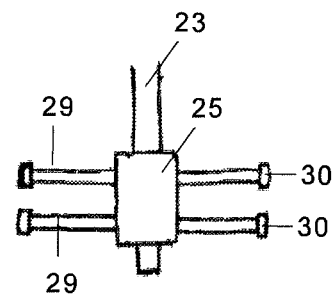
FIG. 4d  FIG. 4e

JOINING DEVICE OF A METAL SEGMENT TO A CONCRETE SEGMENT IN A HYBRID HOLLOW TOWER

RELATED APPLICATION

This application is an application under 35 U.S.C. 371 of International Application No. PCT/ES2016/000043 filed on Apr. 6, 2016, the entire contents of which are incorporated herein by reference.

FIELD OF THE INVENTION

The invention relates to high hollow towers such as those that support wind turbines of several MW and, more particularly, to a joining device of a metal segment to a concrete segment in a hybrid hollow tower.

BACKGROUND

The development and innovation in the field of wind turbines in recent decades has resulted in increasing the size and power of wind turbines thus leading to an increase in the dimensions in height and diameter of their supporting towers.

Hybrid towers formed by a set of concrete segments in the lower part and one or more metal segments in the upper part are one the tower architectures suitable to meet these requirements.

For connecting a metal segment to a concrete segment the most commonly used solution is probably using prestressed steel bars 5 arranged in a widened area 13 of the upper end of the concrete segment 11 fixed to an anchoring plate 7 by nuts 8 (see FIGS. 1a and 1b). Once the construction of the concrete segment 11 is completed, the prestressed steel bars 5 are embedded in the concrete of said widened area 13 with projecting ends arranged to serve as attachment means with the base 17 of metal segment 15 together with nuts 9.

In a variant of that solution anchoring plates 7 are not embedded in the concrete of the widened area 13. Among its disadvantages the following should be noted:
  Prestressed steel bars 5 have to be placed one by one with the difficulties that entails taking into account the situation in height of concrete segment 11. It slows down the mounting process.
  A platform for access to the anchoring plates 7 of prestressed steel bars 5 is required.
  The maximum tolerances for the correct positioning of the prestressed steel bars 5 are great. Relative displacements between the ducts during concreting can occur.
  In case of on-site concrete towers, the assembly process is severely penalized.

In another variant of the solution aforementioned anchoring plates 7 are embedded in the concrete of the widened area 13. Among its disadvantages the following should be noted:
  It is more difficult to ensure the correct positioning of the prestressed steel bars 5. Relative displacement between them can occur during concreting.
  In case of on-site concrete towers, the assembly process is severely penalized.

The present invention is directed to solving these problems.

SUMMARY OF THE INVENTION

In a first aspect, the invention provides a joining device of a metal segment to a concrete segment of a hollow tower in which the second has a widening area with reinforcement to serve as support base for the first. The joining device is formed by a set of bolts passing by one of its ends by holes of an anchoring ring and attached to its both sides by a first set of nuts and arranged to be attached by its other end to the base of the metal segment by a second set of nuts. The anchoring ring includes a set of connectors extending externally and internally thereto in a substantially perpendicular direction to the bolts and arranged so do not interfere with reinforcement. The joining device is embedded in the widened area of the concrete segment except the protruding ends of the bolts to be joined to the metal segment. That joining device provides a very efficient anchoring structure for the bolts as it allows using an anchoring ring of reduced width which facilitates its installation in the concrete segment because said connectors provide an additional area of contact with the concrete to transmit it by adherence the stresses received by the bolts.

The joining device of the invention is especially advantageous when the metal segment and the concrete segment have a cylindrical and/or frustoconical shape. The anchoring ring has a circular shape, the bolts are located at the same distance from the center of the anchoring ring and the connectors are arranged radially.

In one embodiment, the anchoring ring has a rectangular cross section and said connectors are attached to the side surfaces of the anchoring ring and alternately arranged a different distance from their upper edges.

Advantageously, the connectors of anchoring ring are configured with a protruding end to increase their adherence capability to the concrete.

In a second aspect, the invention provides a hollow tower comprising at least a metal segment joined to a concrete segment by means of said joining device.

Other characteristics and advantages of the present invention will be clear from the following detailed description of embodiments illustrative of its object in relation to the attached drawings.

BRIEF DESCRIPTION OF DRAWINGS

FIGS. 4c, 4d and 4e are, respectively plan, partial side elevation and partial front elevation views of the joining device.

DETAILED DESCRIPTION OF THE INVENTION

The present invention propose the use of a bolt cage as a joining device of a metal segment to a concrete segment of a hollow tower such as those used to support wind turbines where said segments have a cylindrical and/or frustoconical shape.

Figure 1A:
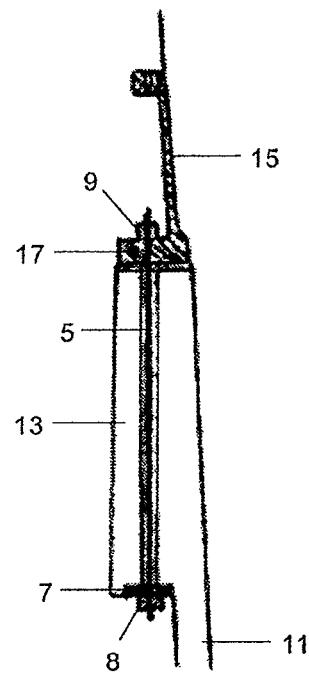
FIG. 1a is a cross-sectional view of the joining area of a metal segment and a concrete segment of a hollow tower with a joining device known in the art and FIG. 1b is a partial perspective view of the bottom of a bar fixed to one of the anchor plate used in said joining device.
Figure 1B:
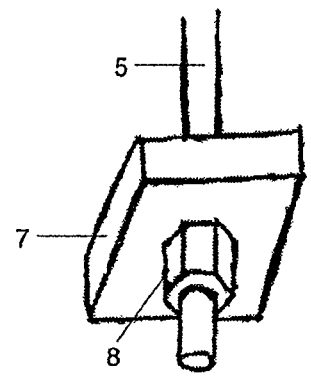
Figure 2A:
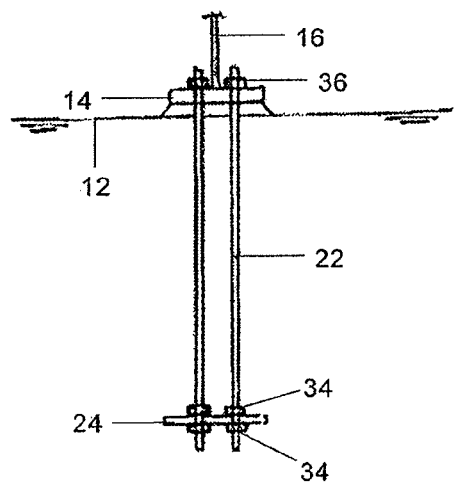
FIG. 2a is a cross sectional view of a bolt cage used to attach a metal segment of a hollow tower to its foundation and FIG. 2b is a partial perspective view of the lower portion of said bolt cage.
Figure 2B:
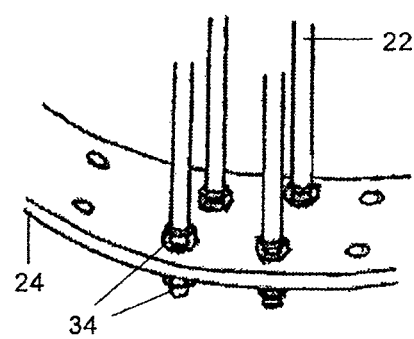

The use of a bolt cage for joining a metal tower 16 to a foundation is well known (see FIGS. 2a and 2b) being the bolt cage formed by a set of bolts 22 attached to an anchoring ring 24 by nuts 34 arranged on its both sides. The set of bolts 22 is arranged in said anchoring ring 24 following the traces of two concentric circumferences at a prefixed distance between them.

That bolt cage is installed in the hole of the foundation of the metal tower 16 leaving the free ends of the bolts 22 protruding from the ground plane 12 so that can serve as joining means to the base 14 of the metal tower 16 together the nuts 36. At a later stage the concreting of the foundation is carried out and the bolt cage is embedded by the concrete.

With that structure, the bolts 22 transmit both the pre-stressing forces as the forces that try to open/decompress the steel-concrete joint to the foundation by means of anchoring ring 24.

Figure 3A:
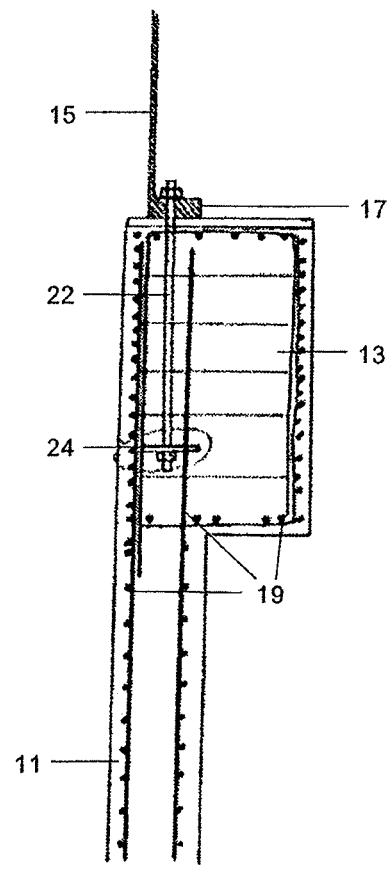
FIG. 3a is a cross sectional view of the joining area of a metal segment and a concrete segment of a hollow tower showing the problems arising if a bolt cage such as that shown in FIG. 2a were used and FIG. 3b is a partial perspective view of the lower portion of said bolt cage.
Figure 3B:
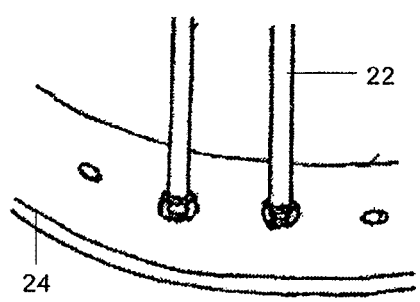
Figure 4A:
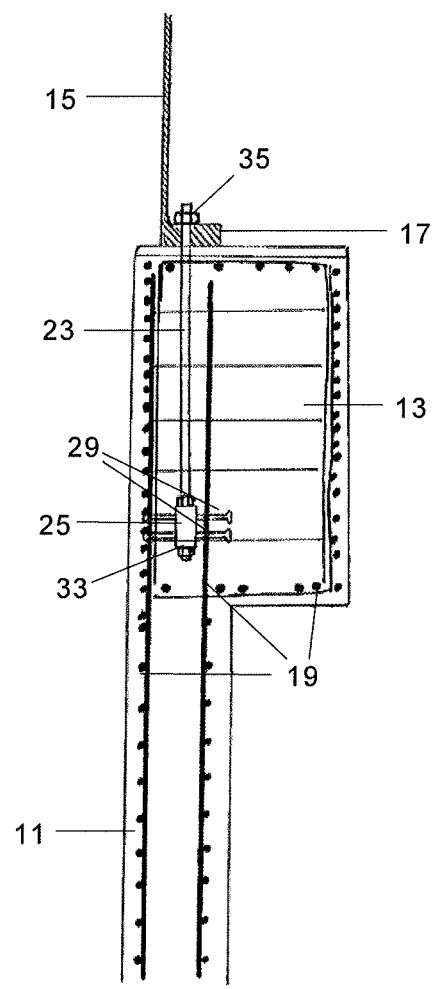
FIG. 4a is a cross sectional view of the joining area of a metal segment and a concrete segment of a hollow tower that includes a joining device according to the invention.
Figure 4B:
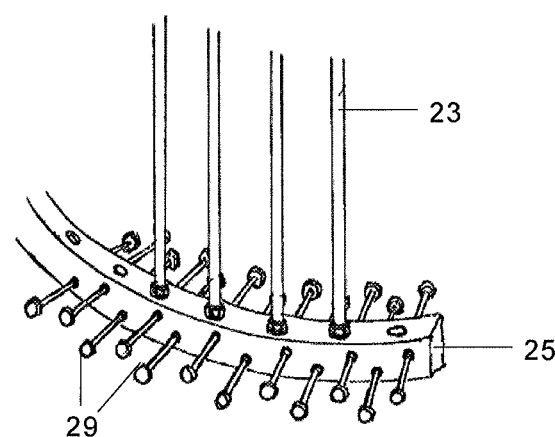
FIG. 4b is a partial perspective view of the bottom of said joining device.

In the case of hybrid towers, the bolt cage solution is potentially interesting for joining a metal segment 15 with a base 17 to a concrete segment 11 with a widened area 13 at its edge in contact with the metal segment 15. A direct application of the same (see FIGS. 3a and 3b) shows that:
In the area where it should be located the anchoring ring 24 there is a high quantity of reinforcement 19 of the widened area 13 in order to bear tensile stresses.
The anchoring ring 24 needed to transmit the efforts of the bolt cage to the concrete is too large.
The available space in the widened area 13 is scarce given the need to provide continuity to reinforcement 19.

As a result of this, there is a high probability of interference between the anchoring ring 24 and the reinforcement 19 that make impractical the applicability of the bolt cage as hinders the correct positioning of reinforcement 19.

To solve this problem the invention proposes (see FIGS. 4a-4e) a joining device in the form of a bolt cage but with a specific configuration. A set of bolts 23 is disposed in an anchoring ring 25 following the trace of a circumference at a prefixed distance between them. They are fixed to the anchoring ring 25 by nuts 33. The joining device further comprises a set of connectors 29 arranged radially on either side of the anchoring ring 25 that complement the anchoring ring 25 as stress transmission means to the concrete by adherence. The connectors 29 are preferably configured with a protruding end 30 to improve their adherence capability to the concrete end. The free ends of the bolts 23 are fixed to the base 17 of the metal segment 15 by nuts 35.

With this configuration the width of anchoring ring 25 is reduced avoiding thereby interference with the reinforcement 19. In turn, the reduced width of the anchoring ring 25 provides the necessary space so that the bolts 23 can pass through it facilitating the adjustment between the shapes of the concrete segment 11 and the metal segment 15.

In the preferred embodiment illustrated in Figures anchoring ring 25 has a rectangular cross section and the connectors 29 are arranged alternately at different distances from the top edges to facilitate compatibility with the reinforcement 19.

Although the present invention has been described in connection with various embodiments, it will be appreciated from the specification that various combinations of elements, variations or improvements therein may be made, and are within the scope of the invention as defined by the appended claims.

The invention claimed is:

1. A joining device for joining a metal segment of a hollow tower to a concrete segment of the hollow tower, the concrete segment having a first area and a second area with the second area being wider than the first area, said wider area having an end portion that is in contact with the metal segment and a reinforcement element for bolstering a tensile strength of the concrete segment, the joining device comprising:
   (a) an anchoring ring having top and bottom surfaces that are opposed to each other and left and right side surfaces that are opposed to each other and that are transverse to the opposed top and bottom surfaces;
   (b) a set of bolts, each of the bolts having a first end and a second end, the set of bolts being configured such that the first ends of the bolts can pass through first holes in the top surface of the anchoring ring with the second ends of the bolts passing through engaging holes in a base of the metal segment;
   (c) a first set of nuts for securing the first ends of the bolts to the top surface of the anchoring ring with the first ends passing through the first holes in the top surface;
   (d) a second set of nuts for securing the second ends of the bolts to the base of the metal segment with the second ends passing through the engaging holes in the base and with the first ends passing through the first holes in the top surface;
   wherein the anchoring ring comprises (i) a first set of connectors extending from the left side surface of the anchoring ring in a first direction that is substantially perpendicular to the bolts and (ii) a second set of connectors extending from the right side surface of the anchoring ring in a second direction that is substantially perpendicular to the bolts, wherein the second direction is different from the first direction; and
   wherein the respective first and second sets of connectors are configured such that, with the first set of nuts securing the first ends of the bolts to the top surface of the anchoring ring and the second set of nuts securing the second ends of the bolts to the base of the metal segment, the first and second sets of connectors do not interfere with the reinforcement element.

2. The joining device according to claim 1, wherein each of the metal segment and the concrete segment has a cylindrical shape or a frustoconical shape, and the anchoring ring has a cylindrical shape.

3. The joining device according to claim 2, wherein the each of the bolts in the set of bolts is disposed the same distance from a center of the anchoring ring.

4. The joining device according to claim 2, wherein each of the connectors in the first and second sets of connectors is disposed radially relative to the anchoring ring.

5. The joining device according to claim 1, wherein the anchoring ring has a rectangular cross section and each of the connectors in the first and second set of connectors is alternately disposed a different distance from respective top edges of the left and right side surfaces.

6. The joining device according to claim 1, wherein each of the connectors in the first and second set of connectors comprises an end with a protrusion to improve adherence of the connector to the concrete segment.

7. A hollow tower comprising:
   (a) a concrete segment comprising a first area and a second area, wherein the second area is wider than the first area, the wider area of the concrete segment comprising a reinforcement element for bolstering a tensile strength of the concrete segment;

(b) a metal segment comprising a base disposed to abut on an end of the wider area of the concrete segment;

(c) a joining device for joining the metal segment to the wider area of the concrete segment, the joining device comprising (i) an anchoring ring having top and bottom surfaces that are opposed to each other and left and right side surfaces that are opposed to each other and that are transverse to the opposed top and bottom surfaces; (ii) a set of bolts, each of the bolts having a first end and a second end, the set of bolts being disposed with the first ends of the bolts passing through first holes in the top surface of the anchoring ring and with the second ends of the bolts passing through engaging holes in the base of the metal segment; (iii) a first set of nuts securing the first ends of the bolts to the top surface of the anchoring ring; and (iv) a second set of nuts securing the second ends of the bolts to the base of the metal segment;

wherein the anchoring ring comprises (i) a first set of connectors extending from the left side surface of the anchoring ring in a first direction that is substantially perpendicular to the bolts and (ii) a second set of connectors extending from the right side surface of the anchoring ring in a second direction that is substantially perpendicular to the bolts, wherein the second direction is different from the first direction; and wherein the respective first and second sets of connectors are configured such that, with the first set of nuts securing the first ends of the bolts to the top surface of the anchoring ring and the second set of nuts securing the second ends of the bolts to the base of the metal segment, the first and second sets of connectors do not interfere with the reinforcement element.

8. The hollow tower according to claim 7, wherein each of the metal segment and the concrete segment has a cylindrical shape or a frustoconical shape, and the anchoring ring has a circular shape.

9. The hollow tower according to claim 8, wherein each of the bolts is disposed at the same distance from the center of the anchoring ring.

10. The hollow tower according to claim 9, wherein each of the connectors is disposed radially relative to the anchoring ring.

11. The hollow tower according to claim 7, wherein the anchoring ring has a rectangular cross section and each of the connectors in the first and second set of connectors is alternately disposed a different distance from respective top edges of the left and right side surfaces.

12. The hollow tower according to claim 7, wherein each of the connectors in the first and second set of connectors comprises an end with a protrusion to improve adherence of the connector to the concrete segment.

13. The hollow tower according to claim 7, wherein the reinforcement element extends in longitudinal direction from the wider area to the first area, wherein the anchoring ring is an annulus having a diameter in the longitudinal direction, and wherein the first set of connectors are spaced on the left side surface around an entire periphery of the anchoring ring, the second set of connectors are spaced on the right side surface around an entire periphery of the anchoring ring, and the set of bolts are spaced on the top surface around an entire periphery of the anchoring ring.

* * * * *